BLOCK PRECODING FOR MULTIPLE SPEED DATA TRANSMISSION

Filed June 13, 1967 3 Sheets-Sheet 1

INVENTOR
R. W. CHANG
BY J. P. Kearns
ATTORNEY

BLOCK PRECODING FOR MULTIPLE SPEED DATA TRANSMISSION

Filed June 13, 1967

United States Patent Office 3,522,383
Patented July 28, 1970

3,522,383

BLOCK PRECODING FOR MULTIPLE SPEED DATA TRANSMISSION

Robert W. Chang, Middletown, N.J., assignor to Bell Telephone Laboratories, Incorporated, Murray Hill, N.J., a corporation of New York Filed June 13, 1967, Ser. No. 645,811
Int. Cl. H04b *1/66;* H04j *3/18*
U.S. Cl. 179—15.55 8 Claims

ABSTRACT OF THE DISCLOSURE

Circuit apparatus for block precoding and transmission of serial data information symbols over band-limited facilities as coefficients of othonormal basis vectors by means of resistive matrices attains different effective transmission rates less than the theoretical maximum rate without alteration of the characteristics of the transmission facility.

FIELD OF THE INVENTION

This invention relates generally to the transmission of data intelligence over band-limited transmission facilities and specifically to the block precoding of such data to achieve selective modes of transmission at various effective data transmission rates.

BACKGROUND OF THE INVENTION

In conventional amplitude-modulation data transmission systems, the modulated signals are time translates of the baseband signals. Each signaling interval, whether at baseband or as modulated onto a carrier wave, conveys the same item of intelligence, whether binary, multilevel or analog sample. In order to maximize signal-to-noise ratio in these systems in the presence of band-limited white noise, the overall transmission channel characteristic must be in consonance with Nyquist's criteria and within the constraints of fixed signal power on the transmission channel. No intersymbol interference is occasioned thereby and the transmission system is regarded as optimum. The overall channel characteristic is usually divided equally between a transmitting and receiving filter. The maximum data transmission (baud) rate is fixed and determined by the channel characteristic.

If this conventional system is operating at the optimum baud rate on a binary basis, the effective signaling rate can be doubled only by changing the information digits to four-level. However, as a consequence the line-signal power requirement must be quadrupled (increased by six decibels) in order to maintain the same error rate. This requirement may not be practically relizable in vie of the level of the noise on the channel or to crosstalk into adjacent channels.

Another known way to change the effective signaling rate is to change the sampling rate and symbol interval. Changing transmitting and receiving filters to a more nearly ideal signal shaping may also be effective. Providing channel equalizers, either frequency domain or time domain, is another conventional way of increasing or altering the effective data or band-limited channels.

SUMMARY OF THE INVENTION

It is an object of this invention to alter the effective data transmission rate over noisy band-limited transmission channels without changing filters, equilization, symbol interval or sampling time.

It is another object of this invention to change the effective data transmission rate by changing the effective baud (symbol) rate and not the number of levels per symbol.

In accordance with this invention, a serial data train is divided into blocks of fixed length, each block is precoded by linear matrix multiplication into a new data train having elements which are not necessarily time translates of the elements of the original block, the elements of the precoded block are transmitted as coefficients of time vectors representing the impulse response of the transmission channel at succeeding symbol intervals, and the original block elements are recovered by correlation detection. In order to avoid intersymbol interference at the receiver the scaler matrix multipliers are chosen so that the elements of the original block appear at the receiver as coefficients of a set of orthonormal basis vectors.

If the impulse response of the channel is considered to be a set of time vectors encompassing the length of the chosen data block, the matrix of factors by which the elements of the original block are to be multiplied is chosen such that the product of this matrix and the time vectors representing the channel response is an orthonormal basis set of vectors. The impulse response of a band-limited channel has a finite set of nonzero time samples at a given sampling rate. These samples may legitimately be represented as a time vector. A set of such time vectors can be conceived as defining a vector space. However, these vectors, though linearly independent (that is, none of them is related to any other by linear nonzero coefficients), are not in general orthogonal, that is to say, mutually perpendicular. It is always possible, however, to transform these uncoordinated vectors, and thus define the same vector space, by a set or othonormal basis vectors, that is, a set of vectors which are of unit length and mutually perpendicular.

There exists an infinite number of such orthonormal basis sets of vectors. An appropriate one may be chosen to control eye openings of the several equivalent reception subchannels, to control the timing error in each subchannel or to provide a noise monitoring channel. The problem of such choices is a nonlinear one, however, and not susceptible to hard and fast rules or algorithms. Computer simulation may be necessary to resolve a given problem.

Once a given block length is chosen and an appropriate multiplying matrix found, the effective data transmission rate can be changed according to this invention by transmitting zeroes in certain block positions. For example, if a block length of three is chosen and the transmission channel is of the Class I partial-response type, having two nonzero samples in its impulse response, samples being taken at the Nyquist rate of the reciprocal of twice the channel bandwidth, each transformed block of three occupies four sampling intervals. The effective data transmission rate will then be three-fourths the Nyquist rate. By reblocking the input data into lengths of two elements and transmitting zero in the third position, the effective data rate becomes one-half the Nyquist rate without any other change in the system itself. Choosing other block lengths and finding an appropriate matrix therefor permits transmission at any rate which is a rational fraction (that is, a ratio of integers) of the Nyquist rate.

In this invention the multiplying matrix itself can be implemented practically by resistive potentionmeters and inverters, as necessary. Each multiplying factor lies between plus and minus one. It is accordingly a feature of this invention that the system performance (such as represented by eye opening) can be optimized for each data rate by simply changing the resistive elements implementing the multiplying matrix when changing the data rate.

DESCRIPTION OF THE DRAWING

The above and other features, objects and advantages of this invention can be more fully appreciated by a consideration of the following detailed description and the drawing in which.

DETAILED DESCRIPTION

Figure 1:
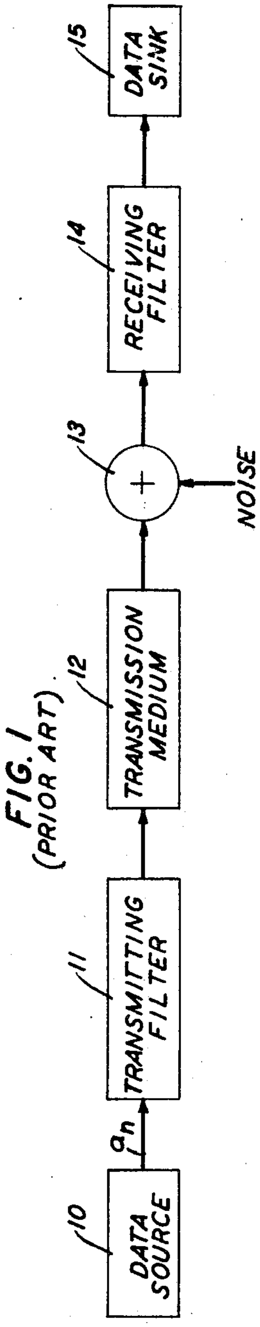
FIG. 1 (PRIOR ART)
FIG. 1 is a block diagram of a prior art data transmission system.

FIG. 1 of the drawing is a generalized block diagram of the typical prior-art data transmission system. Such a system generally comprises a data source 10, emitting data symbols $a_n$ in binary or multilevel fashion at a synchronous symbol (baud) rate related to the available bandwidth of its transmission channel; a transmitting filter 11, which may include modulation components to confine the signal to the bandwidth of the channel, to shape it and to exclude out-of-band noise; a transmission medium 12 with finite bandwidth; a receiving filter 14, which may include demodulation components, to complete the channel shaping; and a data sink 15 for applying appropriate decision criteria to the received signal to reconstruct the transmitted message. The transmission rate in conjunction with the channel shaping and bandwidth is designed to achieve optimality in the sense of maximum signal-to-noise ratio and no intersymbol interference. In general, no baud rate has been attained in practice which equals the theoretical maximum of two bauds per cycle of bandwidth.

A new type of transmission channel has lately come under investigation whereby transmission rates equal to the theoretical maximum of two bauds per cycle of bandwidth can be realized. These new channels are called partial-response channels, and have been disclosed in the copending patent application of E. R. Kretzmer, Ser. No. 441,197, filed Mar. 19, 1965 and entitled "Partial Response Data System," now U.S. Pat. No. 3,388,330, issued June 11, 1968. In this type of channel the impulse response to a given input extends over more than one symbol interval and intersymbol interference is deliberately provoked. However, by control of the channel shaping, the number, spacing and polarity of the nonzero samples of the impulse response at the chosen sampling rate can be predetermined. Thus, the original message can be recovered by logical combinations of successive stored samples of the received signals. Moreover, it is possible by precoding to compensate the transmitted signal prior to transmission for the structured intersymbol interference so that the original message can be recovered from individual samples of the received signal.

Reference is made hereinafter by way of specific embodiment of this invention to the partial-response shaping denominated Class I by Kretzmer in the aforesaid copending application. The particular Class I shaping of interest is that which produces two nonzero samples of equal amplitude and of the same polarity in the impulse response to a single input signal. These samples are spaced by the reciprocal of twice the bandwidth of the transmission channel being shaped.

The present invention relates to a novel precoding system and method for partial-response channels using matrix representations which yield certain unexpected dividends in the way of changing data rates and eye patterns.

Figure 2:
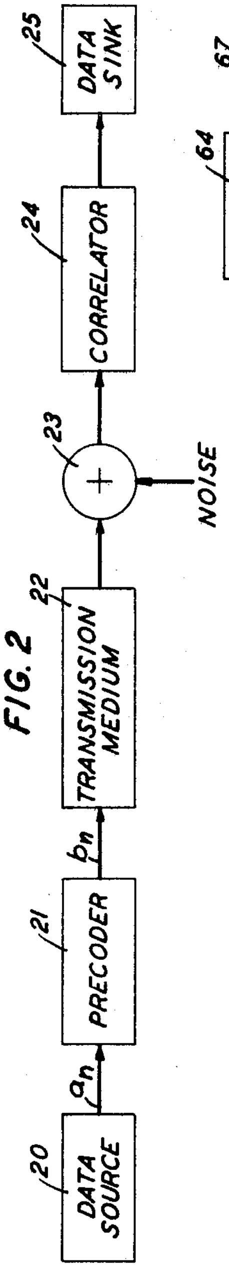
FIG. 2 is a block diagram of a precoded data transmission system according to this invention.

FIG. 2 is a block diagram representative of the precoding scheme of this invention. A serial data train $a_n$ from a source 20 is precoded in precoder 21 to form a new data train $b_n$ whose individual elements are not time translates of the elements of the original train $a_n$, that is, a single sample of an element $b_n$ does not yield in element $a_n$. The elements $b_n$ are rather a linear summation of two or more elements $a_n$ obtained by multiplication by a matrix of scalar factors $\underline{\Lambda}$ of equal length blocks of elements $a_n$. Elements $b_n$ are transmitted through a medium 22 having a partial-response shaping.

The partial-response shaping for each input $b_n$ can be represented by a set of time vectors $\underline{H}$ spanning a greater number of symbol intervals than the chosen block length of elements $a_n$. The set of scalar matrix factors $\underline{\Lambda}$ is chosen to make the signal at the far end of medium 22 with noise symbolically added at circle 23, equivalent to the transmission of elements $a_n$ as coefficients or coordinates of a set of orthonormal basis vectors $\underline{V}$. The elements of block $a_n$ are then recovered in correlator 24 at the receiving end of medium 22 by correlation with the set of orthonormal basis vectors $\underline{V}$. The outputs of correlator 24 are finally compared with predetermined thresholds to determine the individual elements of $a_n$.

The principle of this invention will be better understood from the following detailed analysis.

Transmission medium 22 is assumed to be band-limited between 0 and $f_c$ Hertz (hereinafter abbreviated "Hz.," the international unit denoting frequency in cycles per second) and to have a Class I partial-response shaping such that each input generates an impulse response $h(t)$ with two equal nonzero samples spaced by the Nyquist interval in seconds $$T_c = 1/(2f_c) \qquad (1)$$

A block of input symbols $a_1, a_2 \ldots a_N$ is to be transmitted from source 20 to sink 25 over medium 22. Each symbol can be an $m$-ary digit ($m$ greater than or equal to 2) or a real number such as a time sample of an analog signal waveform.

Precoder 21 converts $a_1, a_2 \ldots a_N$ into a new sequence of numbers $b_1, b_2 \ldots b_N$ and transmits these numbers sequentially at times $t=T_c, 2T_c \ldots NT_c$. The signal at the input of receiver becomes:

$$S(t) = b_1h(t-T_c) + b_2h(t-2T_c) + \ldots + b_Nh(t-NT_c) \qquad (2)$$

Since the impulse response of medium 22 is band limited, it can be represented by a vector of time samples $h(t)$. If the time sample vector representing $h(t-nT_c)$ is $\underline{h}_n$ (underlined letters herein represent vectors), Equation 2 can be rewritten in vector form as:

$$\underline{S} = b_1\underline{h}_1 + b_2\underline{h}_2 + \ldots + b_N\underline{h}_N \qquad (3)$$

The vectors $\underline{h}_1, \underline{h}_2 \ldots \underline{h}_N$ form the vector set $\underline{H}$ and, are linearly independent. They therefore generate a signal space $E_N$ of N dimensions. By linear independence is meant that there exists no set of coefficients other than zero by which each vector can be multiplied and have the summation of the products of the vectors with these coefficients equal zero. Moreover, the vectors $\underline{H}$ are in general not orthogonal, that is mutually perpendicular. It may be noted that, if the vectors $\underline{H}$ are in fact orthogonal, the precoded system and the prior art system are identical.

From Equation 3 it is apparent that the numbers $b_1, b_2 \ldots b_N$ are transmitted as coefficients of $\underline{h}_1, \underline{h}_2 \ldots \underline{h}_N$. Both the input symbols $a_n$ and the precoded numbers $b_n$ can be represented as vectors $\underline{A}$ and $\underline{B}$. Precoder 21 operates on the vector $\underline{A}$ by multiplying it by a scalar matrix $\underline{\Lambda}$ to produce the vector $\underline{B}$. Thus $$\underline{B} = \underline{\Lambda}\underline{A} \qquad (4)$$

$\underline{\Lambda}$ represents a scalar nonsingular matrix of dimension N×N. A scalar is any real number. A nonsingular matrix is one which when multiplied out according to conventional procedures equals some number other than zero. By the proper choice of $\underline{\Lambda}$ the information symbols $a_1, a_2 \ldots a_N$ are effectively transmitted as coefficients of a set of basis vectors $\underline{V}$, having individual vectors $\underline{V}_1, \underline{V}_2 \ldots \underline{V}_N$ which define the same signal space as the vectors $\underline{H}$. A set of basis vectors is any independent set of vectors which completely defines a space, as two nonparallel lines define a plane. Assuming such a set were found, the signal at the input of correlator 24 becomes $$\underline{S}=a_1\underline{V}_1+a_2\underline{V}_2+\ldots+a_N\underline{V}_N. \qquad (5)$$

Although there are an infinite number of vector sets $\underline{V}$ available for choice it is convenient to choose an orthonormal basis set of vectors. By orthonormal is meant that each vector of the set is of unit length and all vectors are mutually perpendicular. The physical structure of precoder 21 is completely determined after the choice of $\underline{\Lambda}$ is made. Considerations in making such a choice are set forth hereinafter.

Correlator 24 operates on the received signal given in Equation 5. Noise $\underline{N}$ is added by the transmission medium. Rewritten, the received signal of Equation 5 becomes $$\underline{X}=\underline{S}+\underline{N} \qquad (6)$$

Since the vector set $\underline{V}$ is orthonormal, the correlation of Equation 6 with $\underline{V}$ yields $$\underline{X}'\underline{V}_k=a_k+\underline{N}'\underline{V}_k \qquad (7)$$

The prime on $\underline{X}$ indicates transposition of its vector representation by an exchange of rows and columns. Subscript $k$ indicates a particular one of the original data block.

Data sink 25 has only to slice at proper thresholds the outputs of correlator 24 to recover the actual transmitted data.

The foregoing general analysis can be applied to the practical problem of transmission at multiple data rates. Transmission medium 22 is assumed to have the square root of the raised cosine characteristic, a bandwidth of $f_c$ Hz., and is equalized for transmission at half the Nyquist rate. It is desired to transmit at two possible data rates depending on the noise level. To change the data rate without changing the sampling rate, the format of the data stream must be changed. However, the system is not to be changed otherwise. The filters, equalization, symbol interval and sampling time are to remain unchanged.

In the prior art system of FIG. 1 the maximum synchronous binary data rate is determined primarily by the design of the transmitting and receiving filters, i.e., by the available bandwidth of the system. Interference-free transmission is not possible at sampling (baud or symbol) rates exceeding this available bandwidth. (See in this connection chapter 5 of the text Data Transmission by W. R. Bennett and J. R. Davey published by McGraw-Hill Book Company 1965. Accordingly, under the constraints that filter designs, including equalization, and sampling times shall remain fixed, the effective data rate in prior art systems can only be altered by changing the number of levels transmitted per symbol (or baud).

For a 2400-Hz. channel a data rate of 2400 bits is obtainable for binary transmission: 4800 bits, for four-level; and 7200 bits, for eight-level. However, line signal requirements are increased by six decibels (quadrupled) for each doubling of the number of levels, provided the same error rate is to be preserved.

In the system according to this invention the increase from 480° to 7200 bits per second can be accomplished with only a 1.76-decibel increase in the signal power requirement. Only the data format is changed.

The input data train $a_1, a_2, \ldots a_N$ is divided into blocks of three: $a_1, a_2, a_3$, and $a_4, a_5, a_6$ and so forth. Precoder 21 converts these into new blocks $b_1, b_2, b_3$ and $b_4, b_5, b_6$ and so forth. The new blocks are transmitted sequentially as $b_1, b_2, b_3$ at times $t=T$, $2T$ and $3T$. Nothing, however, is transmitted at $t=4T$. Block $b_4, b_5, b_6$ is transmitted at times 5T, 6T and 7T. Nothing is transmitted at $t=8T$, and so forth.

The impulse response of medium 22 has been assumed to be that of the Class I partial-response form. Therefore, there are nonzero samples at two sampling points. Written as time sample vectors the impulse responses at times $t=T$, $2T$, $3T$, and $4T$ are, respectively $$\underline{h}_1=\begin{bmatrix}1\\1\\0\\0\end{bmatrix},\ \underline{h}_2=\begin{bmatrix}0\\1\\1\\0\end{bmatrix},\ \underline{h}_3=\begin{bmatrix}0\\0\\1\\1\end{bmatrix} \qquad (8)$$

Equations 8 are neither orthogonal nor normal by matrix definition, since the products of each of them with the transposes of the other is not zero, and the sum of the squares of their elements is not unity. Each element of the vector represents successive time intervals. Since each vector is confined to four sampling time intervals, when each element of the new block is transmitted as a coefficient of one of the time vectors of Equations 8, no interference will be occasioned between blocks. Therefore, only one of the blocks need be considered further.

The vectors of Equations 8 define a vector space $E_3$ of three dimensions. Assume a set of vectors $\underline{V}$ which define the space $E_3$, but which are orthonormal. Let its components and elements be $$\underline{V}_1=\frac{1}{\sqrt{2}}\begin{bmatrix}1\\1\\0\\0\end{bmatrix}\ \underline{V}_2=\frac{1}{\sqrt{2}}\begin{bmatrix}0\\0\\1\\1\end{bmatrix}\ \underline{V}_3=\frac{1}{2}\begin{bmatrix}1\\-1\\-1\\1\end{bmatrix} \qquad (9)$$

The vectors of Equation 9 are normal vectors because the products of each with its transpose is unity. Thus, $$\underline{V}_1'\underline{V}_1=\frac{1}{\sqrt{2}}\times\frac{1}{\sqrt{2}}(1+1)=1$$

for example. They are orthogonal because the product of each with the transpose of the other is zero. For example, $$\underline{V}_1'\underline{V}_2=\frac{1}{\sqrt{2}}\times\frac{1}{\sqrt{2}}(0+0+0+0)=0$$

$\underline{H}$ and $\underline{V}$ generate the same signal space $E_3$. There must, therefore, exist a set of scalar factors $\underline{\Lambda}$ which relate them. That is, $$\underline{V}=\underline{H}\underline{\Lambda} \qquad (10)$$

For a three-dimensional space Equation 10 can be expanded to read $$\begin{bmatrix}V_{11}&V_{21}&V_{31}\\V_{12}&V_{22}&V_{32}\\V_{13}&V_{23}&V_{33}\\V_{14}&V_{24}&V_{34}\end{bmatrix}=\begin{bmatrix}h_{11}&h_{21}&h_{31}\\h_{12}&h_{22}&h_{32}\\h_{13}&h_{23}&h_{33}\\h_{14}&h_{24}&h_{34}\end{bmatrix}\times\begin{bmatrix}\lambda_{11}&\lambda_{21}&\lambda_{31}\\\lambda_{12}&\lambda_{22}&\lambda_{32}\\\lambda_{13}&\lambda_{23}&\lambda_{33}\end{bmatrix} \qquad (11)$$

From the rules for manipulation of matrices solutions can be found for $\lambda_{ij}$ in Equation 11. For example, $$\underline{V}_1=\begin{bmatrix}V_{11}\\V_{12}\\V_{13}\\V_{14}\end{bmatrix}=\lambda_{11}\begin{bmatrix}h_{11}\\h_{12}\\h_{13}\\h_{14}\end{bmatrix}+\lambda_{12}\begin{bmatrix}h_{21}\\h_{22}\\h_{23}\\h_{24}\end{bmatrix}+\lambda_{13}\begin{bmatrix}h_{31}\\h_{32}\\h_{33}\\h_{34}\end{bmatrix} \qquad (12)$$

From Equations 12 and the values for $\underline{H}$ and $\underline{V}$ assumed in Equations 8 and 9

$$\underline{V}_{11}=\lambda_{11}h_{11}+\lambda_{12}h_{21}+\lambda_{13}h_{31} \quad (13)$$

whence $$\lambda_{11}=V_{11}=\frac{1}{\sqrt{2}}$$

$$\lambda_{12}=0$$

$$\lambda_{13}=0$$

Similar equations can be written for $\underline{V}_2$ and $\underline{V}_3$. The remaining λ's are then found to be $$\lambda_{21}=\lambda_{22}=0,\ \lambda_{23}=\frac{1}{\sqrt{2}}$$

$$\lambda_{31}=\lambda_{33}=\frac{1}{2},\ \lambda_{32}=-1$$

Thus, $$\underline{\Lambda}=\begin{bmatrix}\frac{1}{\sqrt{2}} & 0 & \frac{1}{2}\\ 0 & 0 & -1\\ 0 & \frac{1}{\sqrt{2}} & \frac{1}{2}\end{bmatrix} \quad (14)$$

It will be noted that all λ's lie between plus and minus one.

Transposition and substitution of Equation 14 into Equation 4 permits calculation of the components $b_1$, $b_2$, $b_3$ from $a_1$, $a_2$ and $a_3$. Thus, $$b_1=\frac{1}{\sqrt{2}}a_1+\frac{1}{2}a_3 \quad (15)$$

$$b_2=-a_3 \quad (16)$$

$$b_3=\frac{1}{\sqrt{2}}a_2+\frac{1}{2}a_3 \quad (17)$$

Figures 3, 4:
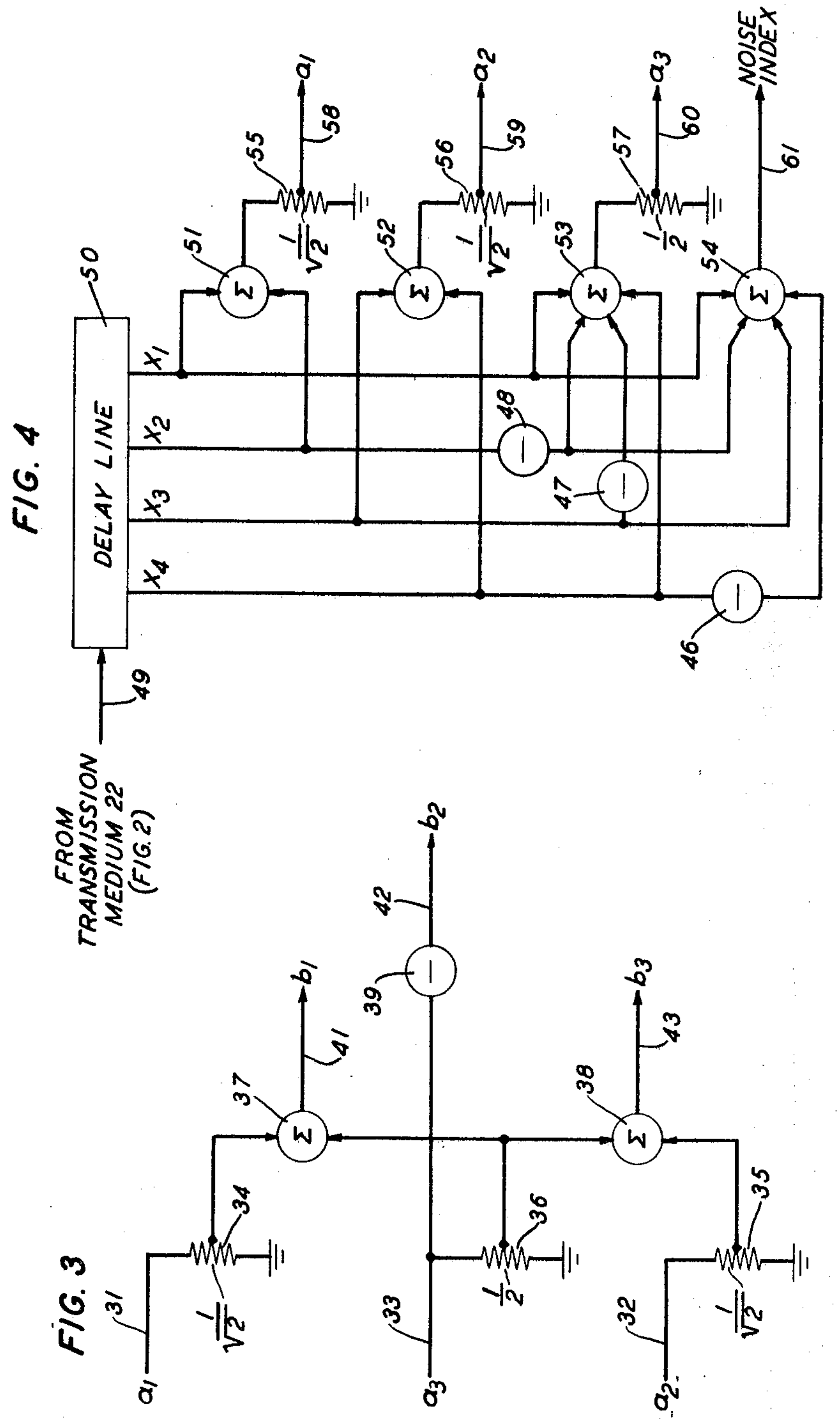
FIG. 3 is a simplified schematic diagram of a precoder for a two-speed data transmission system according to this invention.
FIG. 4 is a simplified schematic diagram of a correlation detector for a precoded two-speed data transmission system according to this invention.

FIG. 3 is a straightforward implementation of Equations 15, 16 and 17. Since all the factors $\lambda_{ij}$ lie between plus and minus one, each factor may be implemented with a potentiometer. In FIG. 3 input digits $a_1$, $a_2$ and $a_3$ are applied on respective leads 31, 32 and 33 to respective potentiometers 34, 35 and 36 set to yield respective ratios of $$\frac{1}{\sqrt{2}}=(0.707),\ \frac{1}{\sqrt{2}}=(0.707)$$

and ½=(0.5). The inputs $a_1$ and $a_3$ on leads 31 and 33 appropriately attenuated by potentiometers 34 and 36 are combined in adder 37 to obtain $b_1$ on lead 41. Similarly, the inputs $a_2$ and $a_3$ appropriately attenuated by potentiometers 35 and 36 are combined in adder 38 to obtain $b_3$ on lead 43. Input $a_3$ inverted in inverter 39 yields $b_2$ on lead 43.

The new block $b_1$, $b_2$, $b_3$ is transmitted through medium 22 as coefficients of the time vectors $\underline{h}_1$, $\underline{h}_2$ and $\underline{h}_3$ in accordance with Equation 3 above. Noise $\underline{N}$ is added as indicated at 23 in FIG. 2. The signal incident on correlator 24 is then in accordance with Equation 6.

FIG. 4 is a block schematic diagram of correlator 24 for the block length of three. The incoming signal on line 49 is delayed in delay line 50 having taps at the symbol interval of $T_c=1/(2f_c)$. The following samples are taken at times T, 2T, 3T and 4T, in accordance with Equations 3 and 8.

$$X_1=b_1=\frac{a_1}{\sqrt{2}}+\frac{a_3}{2} \quad (18)$$

$$X_2=b_1+b_2=\frac{a_1}{\sqrt{2}}-\frac{a_3}{2} \quad (19)$$

$$X_3=b_2+b_3=\frac{a_2}{\sqrt{2}}-\frac{a_3}{2} \quad (20)$$

$$X_4=b_3=\frac{a_2}{\sqrt{2}}+\frac{a_3}{2} \quad (21)$$

Further in accordance with Equation 7

$$a_1=\underline{X}'\underline{V}_1=\frac{1}{\sqrt{2}}(X_1+X_2) \quad (22)$$

$$a_2=\underline{X}'\underline{V}_2=\frac{1}{\sqrt{2}}(X_3+X_4) \quad (23)$$

$$a_3=\underline{X}'\underline{V}_3=\frac{1}{2}(X_1-X_2-X_3+X_4) \quad (24)$$

Equations 22, 23 and 24 are implemented in a straightforward manner as shown in FIG. 4. The time samples $X_1$ and $X_2$ as directed by Equation 22 are combined in adder 51 and attenuated in potentiometer 55 by the factor $1/\sqrt{2}$ to produce the output $a_1$ on lead 58. Similarly, Equation 23 is implemented by adding samples $X_3$ and $X_4$ in adder 52, and attenuating by the factor $1/\sqrt{2}$ in potentiometer 56 to produce the output $a_2$ on lead 59. Equation 24 is effected by adding samples $X_1$ and $X_4$ with samples $X_2$ and $X_3$ inverted by inverters 47 and 48 in combiner 53 and attenuating by the factor ½ in attenuator 57 to produce the output $a_3$ on lead 60. The outputs $a_1$, $a_2$ and $a_3$ are conventionally sliced in data sink 75 to reproduce the transmitted data.

The original data train has been transmitted by the circuitry so far described in the following fashion $$a_1a_2a_30a_4a_5a_60\ \ldots$$

The effective data rate is three-fourths of the sampling rate.

If now it is found that the signal-to-noise ratio at this speed produces too many errors, the effective data rate can be changed merely by reblocking the data in blocks of two and transmitting zero in the third position. The data train actually transmitted then becomes $$a_1a_200a_3a_400a_5a_6\ \ldots$$

The effective data rate is now one-half the sampling rate.

A noise monitoring circuit can be devised as another feature of this invention. The time samples $X_1$, $X_2$, $X_3$ and $X_4$ generate a vector space $E_M$ of four dimensions due to the presence of noise, from which a set of four orthonormal basis vectors can be devised. A fourth basis vector complementing those of Equations 9 can be defined as $$\underline{V}_4=\frac{1}{2}\begin{bmatrix}1\\-1\\1\\-1\end{bmatrix} \quad (25)$$

From Equations 5 and 10 the noise superimposed on the four correlator samples can be isolated according to the following equation $$\underline{X}'\underline{V}_4=\underline{N}'=X_1-X_2+X_3-X_4 \quad (26)$$

In FIG. 4 Equation 26 is implemented by combiner 54 in conjunction with inverters 46 and 48. No additional receiver is necessary. The output on lead 61 is proportional to the noise added by the medium. This output can be monitored and if at any time during transmission the noise should increase or decrease about a predetermined threshold, a signal can be transmitted from the receiver to the transmitter to adjust the effective data rate automatically. During low-speed transmission the output on lead 60 (output $a_3$ during high-speed transmission) acts as a further noise monitoring index.

Figure 5:
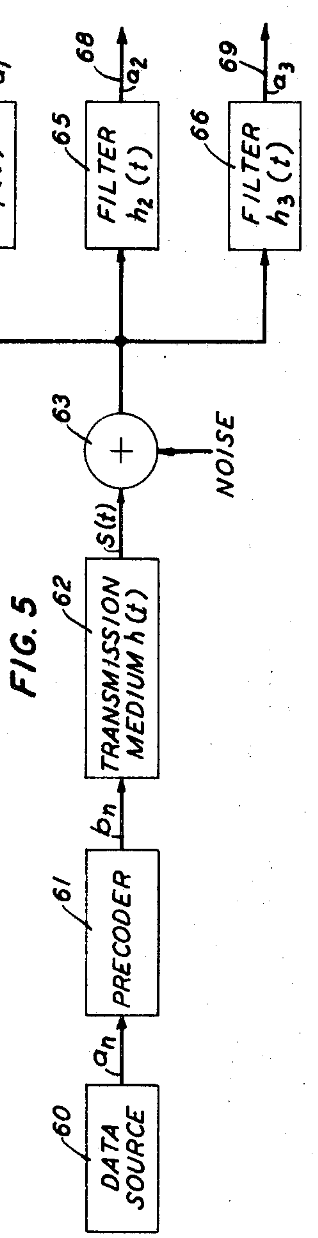
FIG. 5 is an equivalent block diagrammatic representation of the two-speed data transmission according to this invention for purposes of explanation.

In the example described above the components of the vector $\underline{V}$, and hence the scalar matrix Λ, were the result of an arbitrary selection to simplify the explanation. The system can also be considered as comprising three independent subchannles at the receiver as shown in FIG. 5. Here the transmitting side comprises data source 60, precoder 61, transmission medium 62 and noise source 63 comparable to the diagram of FIG. 1. Now, however, three independent subchannels at the receiver are obtained by using matched filters 64, 65 and 66 with parallel inputs and independent outputs on leads 67, 68 and 69. Equation 5 can be rewritten as a time function.

$$s(t)=a_1V_1(t)+a_2V_2(t)+a_3V_3(t) \qquad (27)$$

Each matched filter then has an impulse response $$h_i(t)=v_i(t_0-t) \qquad (28)$$

where $t_0$ is the sampling instant. Each subchannel comprises a precoder, transmission medium and a matched filter. The $i$th subchannel transmits only the digit $a_i$ and there is no intereference from neighboring subchannels because of the orthogonality. However, there is some ambiguity in effecting the correct sampling instant because the receiver timing must be derived from a noisy and jittery received signal. Therefore, there is always a timing error $\delta$. How troublesome $\delta$ can be depends on the eye opening of the $i$th subchannel. The eye opening pattern is obtained as is well known by superpositions of successive received signals on the screen of an oscilloscope. The wider is the opening on the time axis, the wider is the range of permissible sampling error.

It can be shown in a rather laborious fashion that will be omitted here that the eye opening is a nonlinear function of the precoder structure. The precoder structure itself is a function of the λ's as indicated in Equation 11. Therefore, one can cast about with the aid of a computer to select a set of λ's to optimize eye openings at different speeds of transmission. Once the λ's are found and tested they are simple to implement by potentiometers, since they lie in the range of plus and minus one.

At the higher data rate of three-fourths the Nyquist rate all three subchannels are transmitting. I have calculated and tested the following set of λ's to produce equal eye openings at this higher data rate:

$$\begin{array}{lll} \lambda_{11}=0.21 & \lambda_{12}=0.62 & \lambda_{13}=-0.50 \\ \lambda_{21}=-0.68 & \lambda_{22}=0.48 & \lambda_{23}=-0.68 \\ \lambda_{31}=-0.50 & \lambda_{32}=0.62 & \lambda_{33}=0.21 \end{array} \qquad (29)$$

By the use of Equation 10 the V's can be calculated for use at the receiver from the λ's above. Thus, $$\begin{array}{lll} V_{11}=0.21 & V_{21}=-0.68 & V_{31}=-0.50 \\ V_{12}=0.83 & V_{22}=-0.20 & V_{32}=0.12 \\ V_{13}=0.12 & V_{23}=-0.20 & V_{33}=0.83 \\ V_{14}=-0.50 & V_{24}=-0.68 & V_{34}=0.21 \end{array} \qquad (30)$$

Use of the scalar matrix factors given in Equations 29 in a practical system produces nearly equal eye openings in all three subchannels. These eye openings are equal to or better than the eye openings produced in a conventional system with equalization to a 33% cosine rolloff shaping and transmitting at the same data rate.

Other choices for the λ's may be made to improve eye openings of one or two of the subchannels at the expense of the remaining receiving subchannels. Such other choices may be desirable in data multiplexing systems where the messages are of different qualities or to improve the noise monitoring capabilities.

At the lower data rate of one-half the Nyquist rate only two of the subchannels of FIG. 5 are being used. In this case, it may be desirable to improve the eye openings in the subchannels which are transmitting data at the expense of the eye opening of the idle subchannel. Only six λ's need be chosen for the lower data rate. I have calculated the following values for λ.

$$\begin{array}{lll} \lambda_{11}=1/\sqrt{2} & \lambda_{12}=0 & \lambda_{13}=0 \\ \lambda_{21}=0 & \lambda_{22}=0 & \lambda_{23}=1/\sqrt{2} \end{array} \qquad (31)$$

The corresponding V's are $$\begin{array}{l} V_{11}=V_{12}=V_{23}=V_{24}=1/\sqrt{2} \\ V_{13}=V_{14}=V_{21}=V_{22}=0 \end{array} \qquad (32)$$

At the lower data rate, using the λ's of Equations 31 and the $\underline{V}$'s of Equation 32, the system performance is identical to a conventional system equalized for full cosine rolloff.

Figure 6:
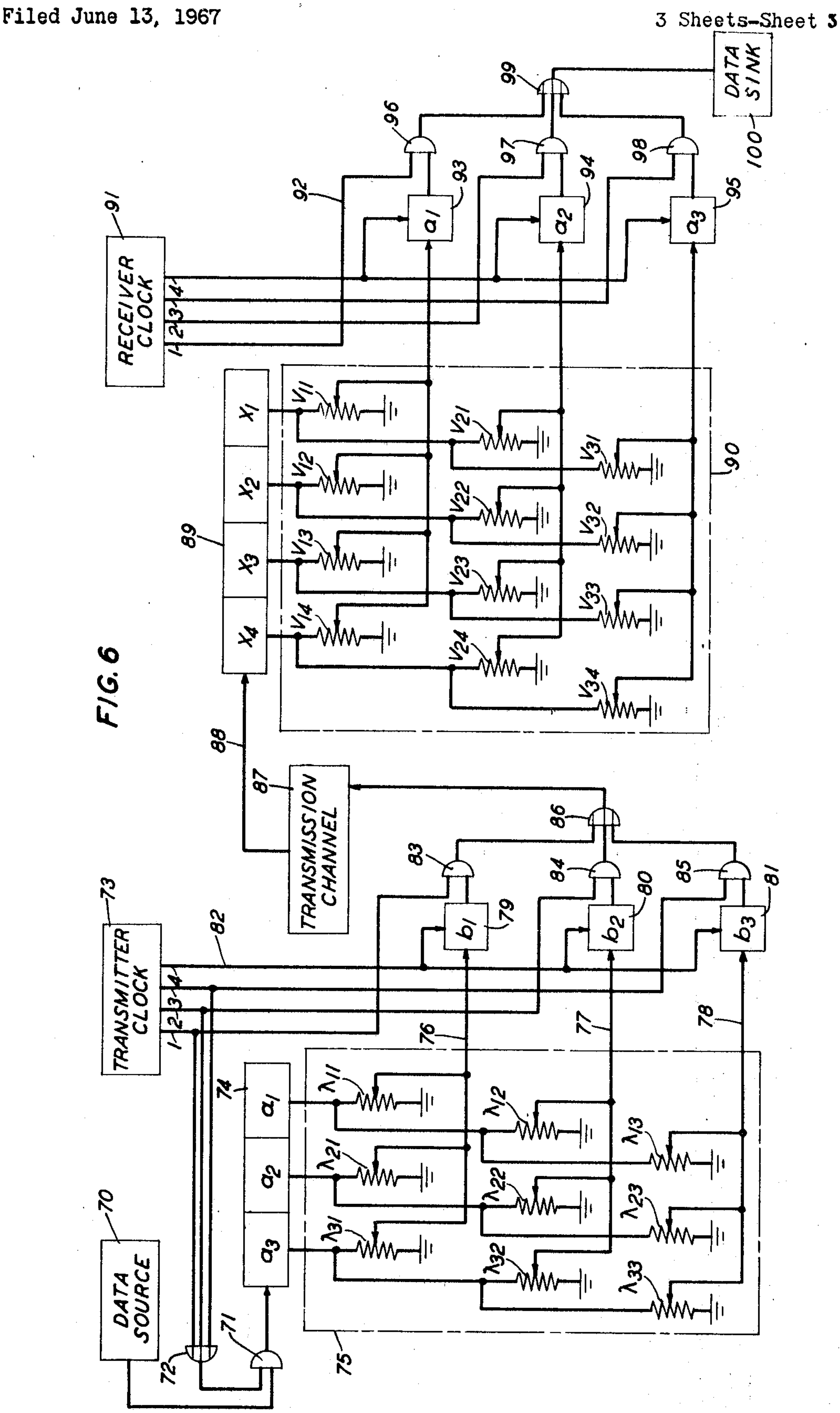
FIG. 6 is a block schematic diagram of a practical two-speed precoded data transmission system according to this invention.

FIG. 6 is a block schematic diagram illustrating a general purpose data transmission system according to this invention for transmitting data in blocks of three. The complete system includes a transmitting station on the left of the figures, a receiving station on the right and a transmission channel interconnecting the transmitting and receiving stations. The transmitting station comprises data source 70, three-stage shift register or delay line 74, matrix 75, clock 73, sample and hold circuits 79, 80 and 81 and logic gates 71, 72, 83, 84, 85 and 86. The receiving station comprises four-stage delay line 89, matrix 90, sample and hold circuits 93, 94 and 95, clock 91, logic gates 96, 97, 98 and 99, and data sink 100.

At the transmitter clock 73 counts at the chosen sampling rate, say the Nyquist rate, and successively activates output leads 1, 2, 3 and 4 in rotation. Leads 1, 2 and 3 through OR-gate 72 and AND-gate 71 admit data from source 70 to the three stages $a_3$, $a_2$ and $a_1$ of register or delay line 74 and advance data therealong from left to right. On the fourth counts of clock 73 no data is admitted to register 74, and no additional advance is made.

Matrix 75 comprises nine potentiometers labeled $\lambda_{11}$ through $\lambda_{33}$ in three rows and three columns. All column λ's with subscripts beginning with 1 are connected to stage $a_1$; those with subscripts beginning with 2, to stage $a_2$; and those with subscripts beginning with 3, to stage $a_3$. The attenuated outputs of all row λ's ending in the subscript 1 are connected to output lead 76; those with the second subscript 2, to lead 77; and those with second subscript 3, to lead 78. Leads 76, 77 and 78 connect, respectively, to the inputs of sample and hold circuits 79, 80 and 81. On the fourth count of clock 73 on lead 82 sample and hold circuits 79, 80 and 81 are caused to store samplaes of the signals then appearing on leads 76, 77 and 78. On the next series of counts 1, 2 and 3 from counter 73, while the second block of data $a_4$, $a_5$, $a_6$ is being admitted to register 74, the former precoded block $b_1$, $b_2$ and $b_3$ is transmitted in sequence through AND-gates 83, 84 and 85 and OR-gate 86 to channel 87.

The signal appearing on lead 88 after traversing channel 87 is admitted to delay line 89 at the receiving station. The outputs of stages $X_1$, $X_2$, $X_3$ and $X_4$ of delay line 89 are applied to matrix 90, which comprises twelve potentiometers in three rows and four columns designated $V_{11}$ through $V_{34}$. All column V's with terminal subscripts 1 are connected to $X_1$; all V's with terminal subscripts 2 are connected to $X_2$; and so forth, as shown in FIG. 6. The attenuated outputs of row potentiometers with initial subscripts 1 are connected to sample and hold circuit 93($a_1$); those with initial subscripts 2, to sample and hold circuit 94($a_2$), and those with initial subscript 3, to sample and hold circuit 95($a_3$).

Receiver clock 91 generates successive outputs 1, 2, 3 and 4 sequentially at the Nyquist rate. Clock 91 is synchronized with the transmitting clock by any known method, such as by transition monitoring of the restored data. On the fourth count of clock 91, the outputs of matrix 90 are admitted to sample and hold circuits 93, 94 and 95. On the first, second and third counts thereof, the outputs of circuits 93, 94 and 95 are sequentially applied to data sink 100 through AND-gates 96, 97 and 98 and OR-gate 99.

For the higher data rate, matrices 75 and 90 are implemented in accordance with Equations 29 and 30; and for the lower data rate, in accordance with Equations 31 and 32. At the lower data rate the count three output of clock 73 is disconnected from OR-gate 72. Register 74, however, is arranged to be advanced on such third counts. Where a zero appears that output is grounded. Inverters (not shown) are added as needed. In the alternative, the several register and delay line stages may be provided with complementary outputs for this purpose. Then the data eye openings produced at each transmission speed will be optimum. It is evident that any other set of λ's and V's may be substituted which accord with the principles of this invention. As a practical matter, the matrices may be integrated circuit components occupying a very small space.

Matrix 90 can be expanded as previously described by selecting a fourth row of potentiometers defined by an additional vector orthogonal with the previously selected vectors $\underline{V}$ to form a basis for measuring noise on channel 87.

The system can readily be expanded in a straightforward manner to provide any multiple data rates whose ratios can be represented by rational fractions. For example, if a block of four is used, data speed ratios of 4/5, 3/5 and 2/5 and 1/5 can be achieved with or without changing matrices, depending on the purpose of the transmission system.

While this invention has been disclosed in terms of specific embodiments, its principles are susceptible of a wide range of modification within the skill of the art.

What is claimed is:

1. A data transmission system comprising:
- a transmission channel of limited frequency bandwith having an impulse response with a finite number of nonzero sample values at the reciprocal of twice the bandwidth thereof,
- a serial data source at the transmitting end of said channel,
- means for grouping data from said source into blocks of equal numbers of symbols,
- precoding matrix means for operating on the symbols in each of said data blocks by preselected scalar weighting factors to form transmission blocks of equal numbers of components,
- said preselected scalar weighting factors being chosen such that the products of the components of said transmission blocks and time vectors representing the impulse response of said channel at successive sampling intervals are equal to the products of a set of orthonormal basis vectors and the symbol values of said data blocks,
- means for applying said transmission blocks to said transmission channel, and
- decoding matrix means at the receiving end of said transmission channel for recovering such data blocks by operating on blocks of received signals by a plurality of weighting factors corresponding to said set of orthonormal basis vectors.

2. The data transmission system as set forth in claim 1 in which said precoding matrix means comprises a plurality of resistive attenuators whose division ratios are proportional to said preselected scalar factors.

3. The data transmission system as set forth in claim 1 in which said decoding matrix means comprises a plurality of resistive attenuators whose division ratios are proportional to said set of orthonormal basis vectors.

4. The data transmission system as set forth in claim 1 in which said grouping means comprises a shift register with as many stages as there are data symbols in a transmitted block.

5. The data transmission system as set forth in claim 1 in which said decoding matrix means comprises a delay line with at least one more delayed output than there are data symbols in a transmission block.

6. The data transmission system as set forth in claim 1 in which:
- the impulse response of said transmission channel exhibits two nonzero samples of equal amplitude and polarity,
- said grouping means forms blocks three data symbols long, and
- said blocks of received signals at the receiving end of said transmission channel are four sampling intervals long.

7. The data transmission system as set forth in claim 1 in which:
- the impulse response of said transmission channel is represented by a set of time vectors $\underline{H}$ having individual vectors $\underline{h}_1, \underline{h}_2 \ldots \underline{h}_N$;
- each data block is represented by a vector $\underline{A}$ having digits $a_1, a_2 \ldots a_N$;
- said precoding matrix means comprises an N by N matrix $\underline{\Lambda}$ of potentiometers individually implementing a set of attenuation factors $\lambda_{11}, \lambda_{12} \ldots \lambda_{NN}$, each in the range of plus and minus one and including zero;
- the output of said precoding matrix responsive to said data blocks comprises a transmission block B having elements $b_1 b_2 \ldots b_N$;
- each transmission block $\underline{B}$ when applied to said transmission channel is a plurality of received signals $\underline{S}$ equal to the products of elements $b_1, b_2 \ldots b_N$ and the channel time vectors $\underline{h}_1, \underline{h}_2 \ldots \underline{h}_N$;
- said decoding matrix represents a set of weighting factors $V_{11}, V_{12} \ldots V_{NN}$, the values of the elements thereof being said set of orthonormal basis vectors $\underline{V}$ equalling the product of said channel time vectors $\underline{H}$ and said scalar weighting factors $\underline{\Lambda}$; and
- the outputs of said decoding matrix responsive to said received signals $\underline{S}$ are said data blocks $\underline{A}$.

8. A multiple speed data transmission system comprising:
- a transmission medium having a bandwitdth of $f_c$ Hertz and shaped such that there are two equal nonzero samples in its impulse response at a sampling interval of $1/(2f_c)$ second;
- a serial data source;
- a transmitter timing source having sequential outputs to the count of four in rotation;
- a three-stage storage register;
- means under the control of said transmitter timing source for admitting successive data digits from said source to said register to the count of three or two of said timing source in the alternative depending on whether effective transmission at three-fourths or one-half the sampling rate is required;
- precoding means including an ordered three-row by three-column matrix of potentiometers having attenuation factors in the range of plus and minus one and including zero,
- the potentiometers in each column being connected at their inputs to respective stages of said storage register and the potentiometers in each row being connected together at their outputs to form three combined outputs for said precoding means;
- three transmitter sample and hold circuits;
- means under the control of the fourth count of said transmitter timing source for admitting to said sample and hold circuits the separate outputs of said matrix to form precoded data digits;
- means under the control of the next group of three counts from said transmitter timing source for applying the outputs of said sample and hold circuits in rotation to said transmission medium;
- means at the receiving end of said transmission medium for storing four successive samples of signals transmitted thereover;
- decoding matrix means including an ordered three-row by four-column matrix of potentiometers having attenuation factors in the range of plus and minus one, the attenuation factors of the potentiometers in said matrix having amplitude settings defined by a set of orthonormal basis vectors equal to the product of a set of time vectors $\underline{H}$ representing the impulse response of said medium at four successive sampling instants and the factors $\underline{\Lambda}$ in said precoding matrix;
- the potentiometers in each column being connected at their inputs to respective outputs of said sample-storing means and the potentiometers in each row being connected together by their outputs to form three separate outputs for said decoding matrix;

a receiver timing source having sequential outputs to the count of four in rotation and synchronized with said transmitter timing source;

three further sample and hold circuits;

means under the control of the fourth counts of said receiver timing source for admitting respective outputs of said decoding matrix to said further sample and hold circuits;

a data sink; and means under the control of three successive counts of said receiver timing source for transferring the contents of said further sample and hold circuits in rotation to said data sink.

References Cited

UNITED STATES PATENTS

| | | | |
|---|---|---|---|
| 3,003,030 | 10/1961 | Oshima et al. | 325—42 |
| 3,204,035 | 8/1965 | Ballard et al. | 179—15 |
| 3,297,951 | 1/1967 | Blasbalg | 178—69 |
| 3,314,015 | 4/1967 | Simone | 325—42 |
| 3,384,715 | 5/1968 | Higuchi et al. | 179—15 |
| 3,388,330 | 6/1968 | Kretzmer | 179—15.55 |

KATHLEEN CLAFFY, Primary Examiner

A. B. KIMBALL, JR., Assistant Examiner

U.S. Cl. X.R.

178—69; 179—15; 325—42, 65